United States Patent
Carvalho

(10) Patent No.: US 9,458,730 B2
(45) Date of Patent: Oct. 4, 2016

(54) PROPELLER BLADE WITH RELATIVELY MOVABLE COUNTERWEIGHT

(71) Applicant: Hamilton Sundstrand Corporation, Windsor Locks, CT (US)

(72) Inventor: Paul A. Carvalho, Hadley, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 865 days.

(21) Appl. No.: 13/735,419

(22) Filed: Jan. 7, 2013

(65) Prior Publication Data

US 2014/0193253 A1 Jul. 10, 2014

(51) Int. Cl.
*F01D 7/00* (2006.01)
*B64C 11/38* (2006.01)
*B64C 11/34* (2006.01)

(52) U.S. Cl.
CPC .............. *F01D 7/00* (2013.01); *B64C 11/346* (2013.01); *B64C 11/385* (2013.01)

(58) Field of Classification Search
CPC ...... F01D 7/00; B64C 11/346; B64C 11/385
USPC ......................................................... 416/139
See application file for complete search history.

(56) References Cited

U.S. PATENT DOCUMENTS

| | | | | |
|---|---|---|---|---|
| 992,985 | A * | 5/1911 | Ramp .................... | B64C 11/385 416/46 |
| RE18,957 | E * | 9/1933 | Gobereau et al. .... | B64C 11/346 416/53 |
| 2,146,334 | A * | 2/1939 | De Caria Ugo ...... | B64C 11/346 416/53 |
| 3,380,535 | A * | 4/1968 | Biermann ............. | B64C 11/385 416/136 |
| 4,032,257 | A * | 6/1977 | de Haas .................. | F03D 3/068 416/111 |
| 4,083,651 | A * | 4/1978 | Cheney, Jr. ........... | F03D 7/0224 416/11 |
| 4,111,601 | A * | 9/1978 | Richard ................ | F03D 7/0252 416/132 B |
| 4,717,312 | A | 1/1988 | Seeley | |
| 4,718,821 | A * | 1/1988 | Clancy ..................... | F03D 7/06 416/119 |
| 4,948,339 | A | 8/1990 | Adamson | |
| 5,304,038 | A | 4/1994 | MacMurray | |
| 5,415,524 | A | 5/1995 | Gamble | |
| 7,581,929 | B2 | 9/2009 | Carvalho | |
| 8,070,449 | B2 | 12/2011 | Urban et al. | |
| 8,167,553 | B2 | 5/2012 | Perkinson et al. | |
| 8,172,530 | B2 | 5/2012 | Perkinson | |
| 8,267,656 | B2 | 9/2012 | Carvalho et al. | |
| 8,277,182 | B2 | 10/2012 | Perkinson | |
| 2011/0189016 | A1 * | 8/2011 | Bornay Rico ........ | F03D 7/0224 416/139 |

FOREIGN PATENT DOCUMENTS

| | | |
|---|---|---|
| EP | 0200337 A2 | 11/1986 |
| GB | 460921 A | 2/1937 |

OTHER PUBLICATIONS

European Search Report for European Patent Application No. 14150272.4 completed on Aug. 5, 2014.

* cited by examiner

*Primary Examiner* — Dwayne J White
*Assistant Examiner* — Aaron R Eastman
(74) *Attorney, Agent, or Firm* — Carlson, Gaskey & Olds, PC

(57) ABSTRACT

A propeller rotor has a hub mounting a plurality of blades. A counterweight is movably mounted on the blade. A pitch change mechanism for changing an angle of incidence of an airfoil is associated with each of the blades. The counterweight twists the blades toward an increased pitch direction should the pitch change mechanism fail. A stop member stops rotation of the counterweight as the blade moves to a feather position.

15 Claims, 5 Drawing Sheets

FLIGHT POSITION

FLIGHT POSITION

FEATHER POSITION

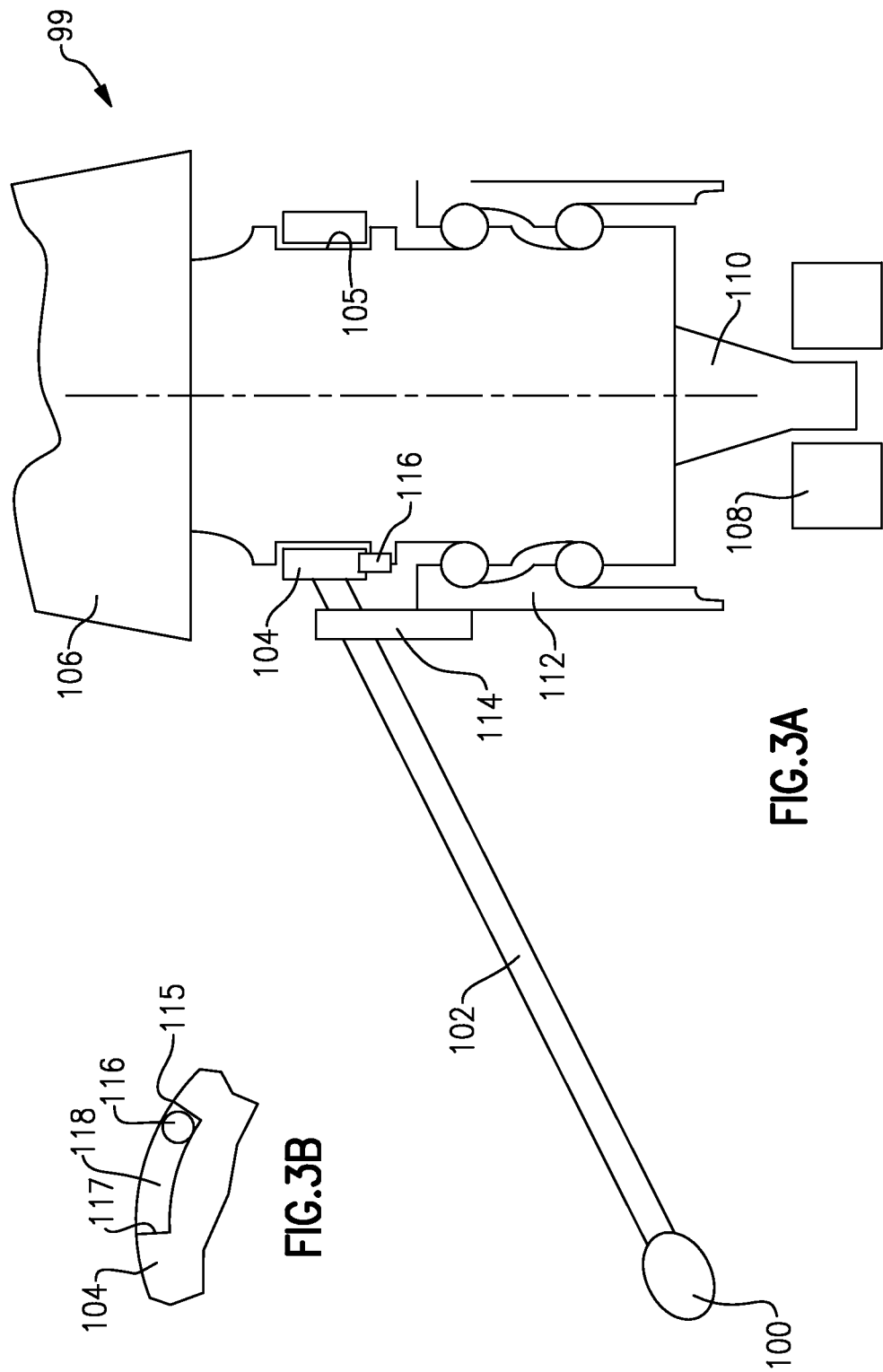

FLIGHT POSITION

REVERSE POSITION

FEATHER POSITION

PROPELLER BLADE WITH RELATIVELY MOVABLE COUNTERWEIGHT

BACKGROUND OF THE INVENTION

This application relates to a counterweight for use in a variable pitch propeller blade assembly.

Propeller rotors typically include a plurality of blades having airfoils. The rotor is provided with a pitch change mechanism that may be hydraulically powered. The pitch change mechanism changes an angle of incidence of the airfoils.

At times, the hydraulic power for changing the pitch of the airfoil has failed. In such a case, it is desirable to increase the pitch angle, rather than allow forces on the unpowered blade to drive the blade airfoil toward a decreased pitch angle.

To this end, counterweights have been fixed to the blade in the past with the counterweight designed to be attached to a base of the blade and produce a twisting moment on the blade when the propeller rotor rotates, such that in that moment on the blade is in a direction to increase pitch.

To optimize the design of the counterweight, it is desirable to place the counterweight at a largest radius from a blade pitch change axis as allowable. However, the blade pitch angle must be capable of movement from a full reverse position to a feather position. The feather position is essentially the position at which the blade is parallel to an approaching air flow.

To achieve the transition between the reverse and feather positions, the counterweight must be capable of passing the adjacent blades. This limits the radius that may be utilized between the counterweight and the blade rotational axis.

SUMMARY OF THE INVENTION

A propeller rotor has a hub mounting a plurality of blades. A counterweight is movably mounted on the blade. A pitch change mechanism for changing an angle of incidence of an airfoil is associated with each of the blades. The counterweight twists the blades toward an increased pitch direction should the pitch change mechanism fail. A stop member stops rotation of the counterweight as the blade moves to a feather position.

These and other features may be best understood from the following drawings and specification.

BRIEF DESCRIPTION OF THE DRAWINGS

FIG. 3A shows an embodiment of an improved rotor.
FIG. 3B shows a detail of the FIG. 3A arrangement.

DETAILED DESCRIPTION

Figure 1:
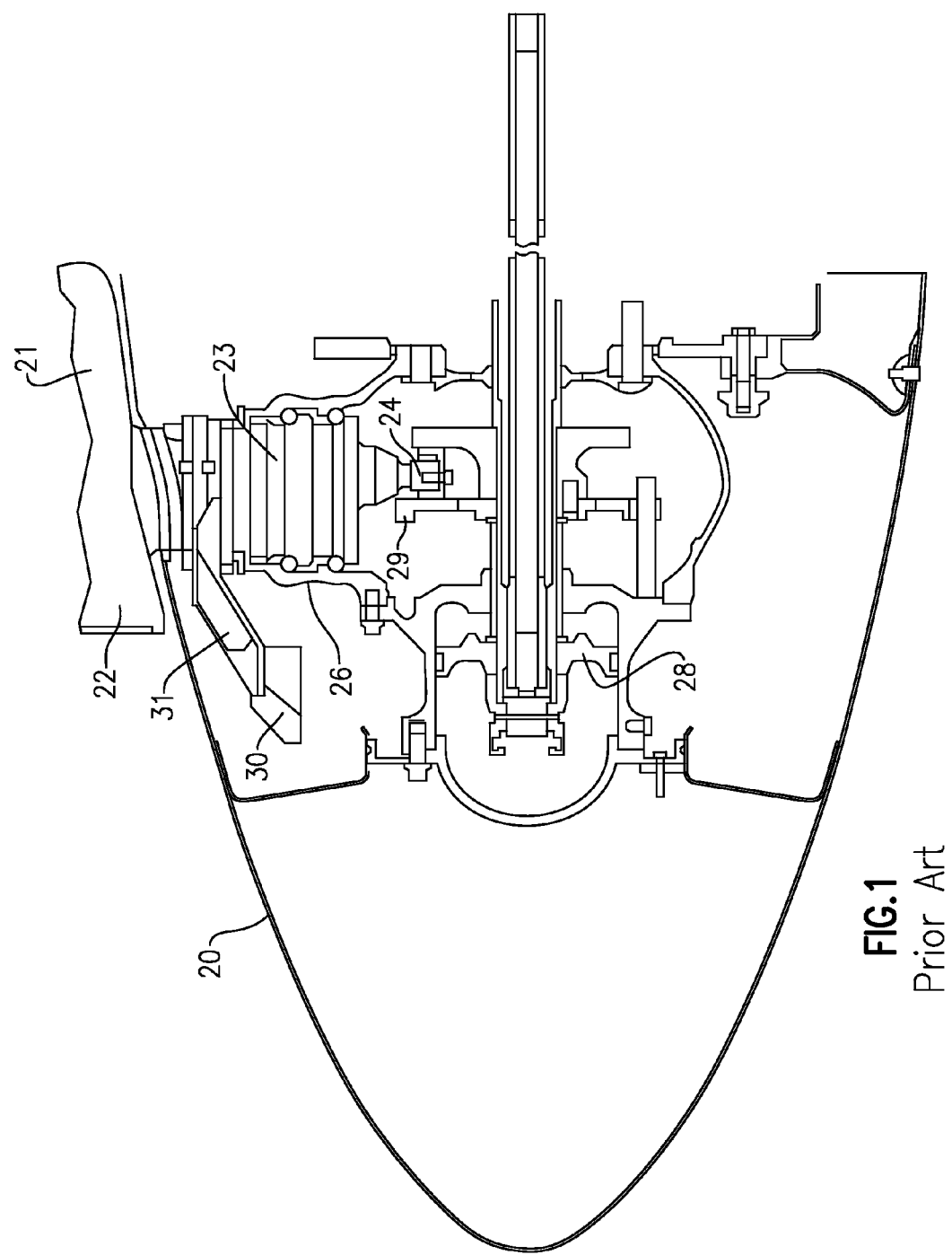
FIG. 1 shows a prior art propeller rotor.

A prior art propeller rotor 20 is illustrated in FIG. 1 having a blade 22 extending inwardly to an inner trunnion portion 24. The blade 22 has a root 23 mounted in a hub 26. A hydraulic piston 28 receives hydraulic fluid to actuate a connection 29 to change an angle of incidence of an airfoil 21 associated with the blade 22 through the trunnion location 24.

At times, this drive arrangement through the hydraulic piston 28 and connection 29 may fail or the hydraulic supply to piston 28 may fail. This could lead to the angle of incidence of the blade airfoil 21 moving toward an undesired position. Thus, a counterweight 30 is attached by an arm 31 to the blade 22. This counterweight has been fixed in the prior art.

Figure 2A:
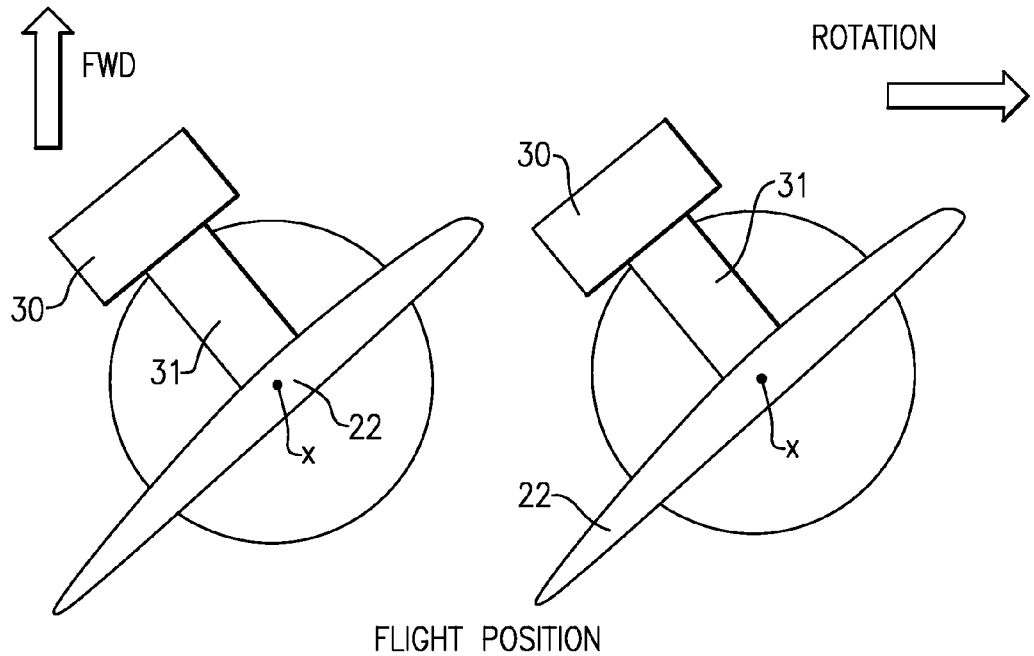
FIG. 2A schematically shows a feature of the prior art rotor.

FIG. 2A shows the arrangement of two adjacent blades 22 each having an arm 31 connecting a counterweight 30. In a flight position, the blades 22 may be positioned as shown in FIG. 2A.

The blades may sometimes be moved to a "feather" position. Essentially, the feather position is a position at which the blades are parallel to an approaching, or forward, direction of the airstream. A worker of ordinary skill in the art would recognize when the feather position should be taken.

Figure 2B:
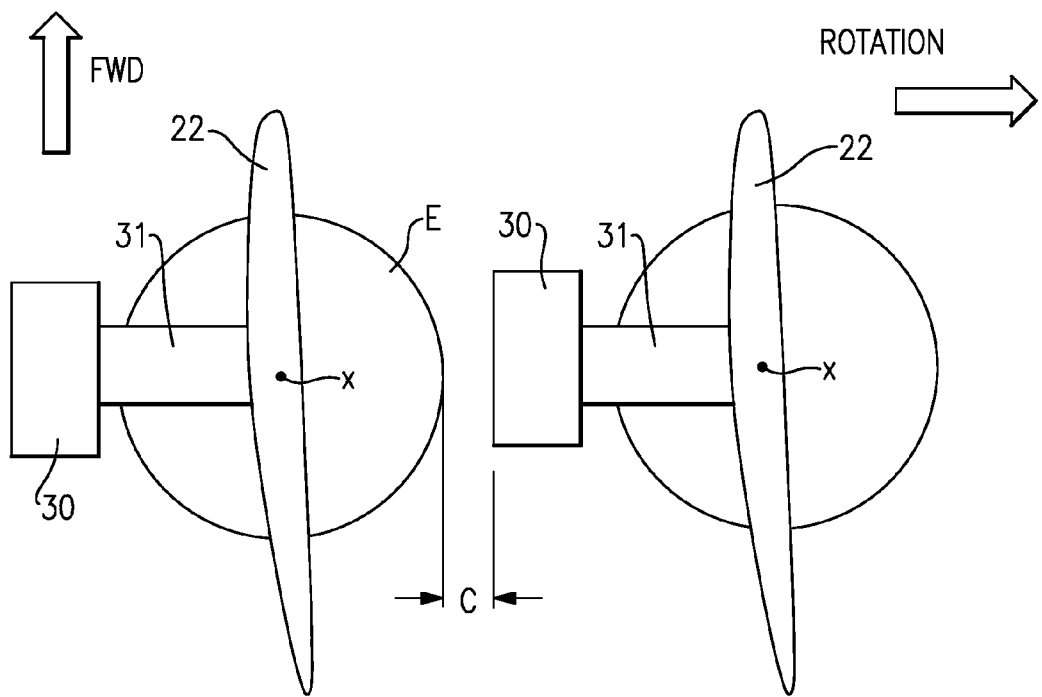
FIG. 2B shows another feather of the prior art rotor.

When moving from the position of FIG. 2A to the feather position of FIG. 2B, the counterweight 30 must pass outer envelope E of the hub and blade. Thus, a clearance C must be maintained. This limits the distance through which the arm 31 may extend from an axis X.

FIG. 3A shows an improved propeller 99. A blade 106 has a counterweight 100 attached by an arm 102 through a collar 104. The collar 104 is rotatable upon a groove 105 in a base of the blade 106. A pin 116 is fixed to the blade base and, as shown in FIG. 3B, a groove 118 in the collar 104 extends between ends 115 and 117. When the pin 116 abuts one of the ends 115 and 117, the counterweight will be able to transmit torque to the blade 106 to provide the safety function mentioned above. Although shown schematically, the blade has its base mounted in a hub 112, and there is actuation structure 108/110 as in the prior art. A hub stop pin 114 is included in hub 112.

Figure 4A:
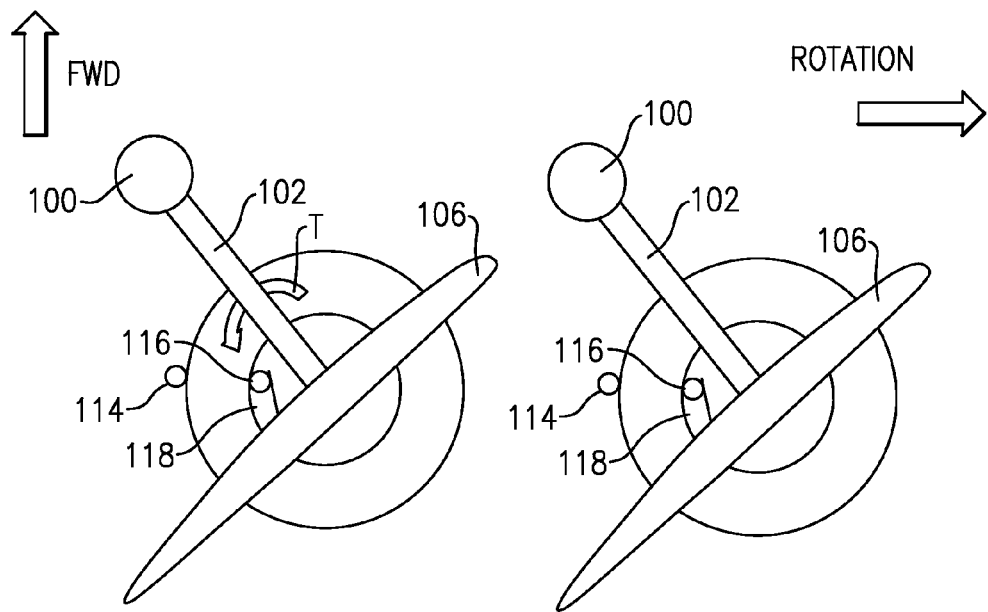
FIG. 4A schematically shows the improved counterweight in a flight position.

FIG. 4A shows a normal flight position. A torque T is transmitted from the counterweight 100 to the blade 106 since an end of the groove 118 abuts the pin 116.

Figure 4B:
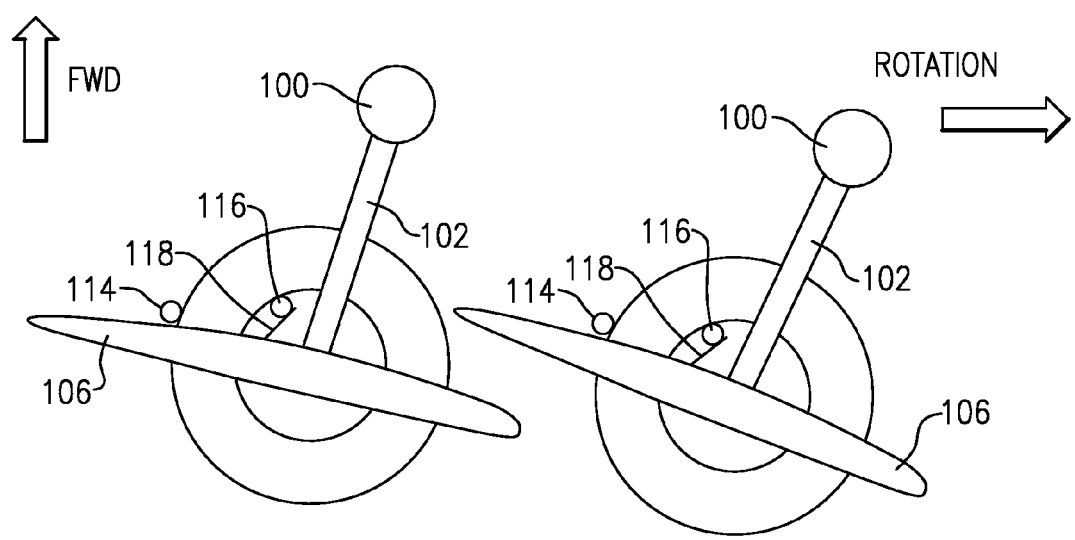
FIG. 4B shows the improved counterweight in a reverse position.

FIG. 4B shows adjacent blades 106 in a reverse position. Again, the pin 116 abuts an end of the groove 118, and a torque will be applied to the blade in the event the variable pitch mechanism fails.

Figure 4C:
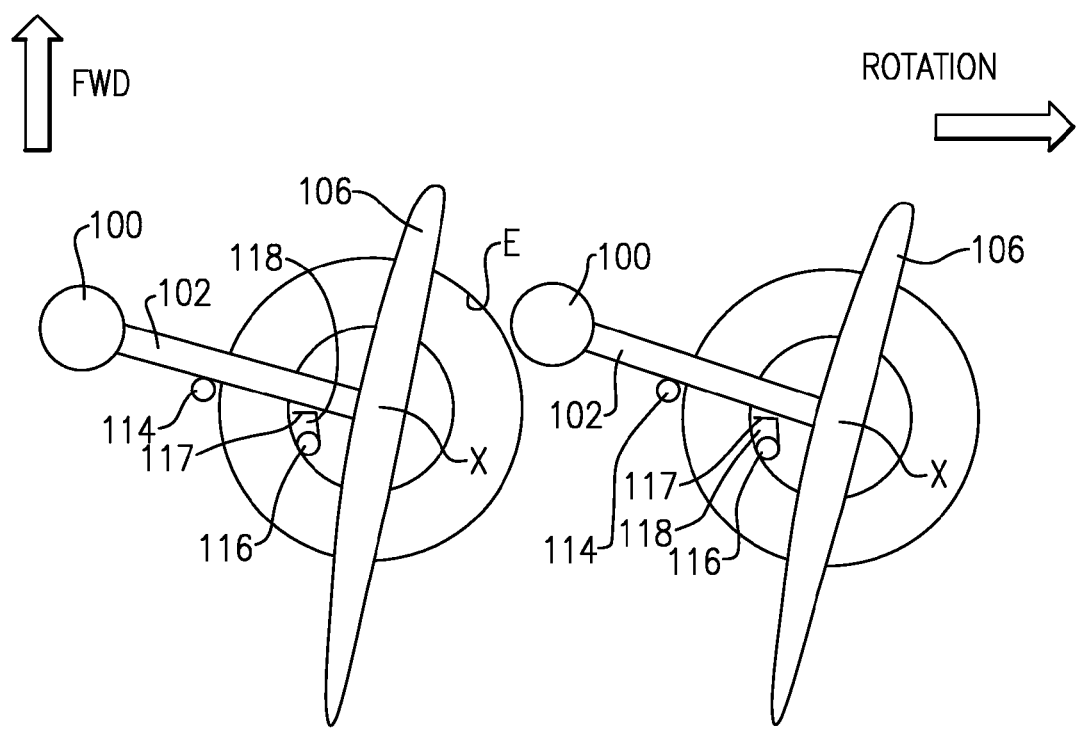
FIG. 4C shows the improved counterweight in a feather position.

FIG. 4C shows the movement to the feather position. In the feather position, the arm 102 abuts the hub stop pin 114. The contact occurs at a point during movement to the feather position. This point is the highest blade angle that requires counterweight protection during normal operation. That is, counterweight 100 may move for a portion of the movement to the feather position, but is stopped at some point such that the counterweight will not cross the envelope E. As shown, the end 117 is now spaced from the pin 116. This means that the blade 106 has rotated further than the arm 102 and counterweight 100. As can be appreciated, the counterweight 100 can now be positioned further from a central axis X about which the pitch of the blades 106 rotates. Stated another way, the arm 102 can be made much longer than in the prior art because the counterweight 100 need not pass the envelope E.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propeller rotor comprising:
   a rotor mounting a plurality of blades, said blades having a root mounted in a hub of said rotor and a counterweight movably mounted on said blades wherein said counterweight is movable relative to said blade;
   a pitch change mechanism for changing an angle of incidence of an airfoil associated with said blades, and said counterweight for biasing said blades toward an increased pitch direction should said pitch change mechanism fail;
   a stop member for stopping rotation of said counterweight as said blade moves to a feathered position; and
   wherein said counterweight moves for a portion of the movement of the blade to the feathered position, but is stopped at some point before the blade reaches the feathered position.

2. The propeller rotor as set forth in claim 1, wherein said stop member includes a stop pin mounted on said hub.

3. The propeller rotor as set forth in claim 1, wherein said blade in said feather position includes said airfoils being moved generally parallel to an approaching direction of air.

4. The propeller rotor as set forth in claim 1, wherein said counterweight is mounted to said blades through an arm, and said arm being connected to a collar which is rotatable about a base of said blade.

5. The propeller rotor as set forth in claim 4, wherein said collar having a groove with circumferential ends, and said hub including a hub pin, said hub pin contacting one of said ends of said groove such that said counterweight transmits torque to said blade.

6. The propeller rotor as set forth in claim 5, wherein when said counterweight contacts said stop member, said hub pin is spaced from said circumferential ends.

7. The propeller rotor as set forth in claim 6, wherein said stop member contacts said arm.

8. The propeller rotor as set forth in claim 7, wherein said stop member stops further rotation of said arm and said counterweight before said counterweight will cross an envelope of movement of a hub and blade of an adjacent one of said plurality of blades.

9. A method comprising:
   mounting a plurality of blades in a hub of a rotor and movably mounting a counterweight on each said blade such that said counterweight is movable relative to said blade;
   changing an angle of incidence of an airfoil associated with each of said blades with a pitch change mechanism, and said counterweight twisting said blades toward an increased pitch direction should said pitch change mechanism fail;
   stopping rotation of said counterweight when said blade moves to a feather position; and
   wherein said counterweight moves for a portion of the movement of the blade to the feathered position, but is stopped at some point before the blade reaches the feathered position.

10. The method as set forth in claim 9, wherein said moving said blades to said feather position includes moving said airfoils generally parallel to an approaching direction of air.

11. The method as set forth in claim 9, wherein said counterweight is mounted to said blades through an arm, and said arm being connected to a collar which rotates about a base of said blade.

12. The method as set forth in claim 9, wherein said collar having a groove with circumferential ends, and said hub including a hub pin, said hub pin contacting one of said ends of said groove such that said counterweight transmits torque to said blade.

13. The method as set forth in claim 9, wherein when said counterweight contacts said stop member, said hub pin is spaced from said circumferential ends.

14. The method as set forth in claim 13, wherein said stop member contacts said arm.

15. The method as set forth in claim 14, wherein said stop member stops further rotation of said arm and said counterweight before said counterweight will cross an envelope of movement of a hub and blade of an adjacent one of said plurality of blades.

* * * * *